US006479574B1

(12) United States Patent
Greigger et al.

(10) Patent No.: US 6,479,574 B1
(45) Date of Patent: Nov. 12, 2002

(54) FIRE RETARDANT COMPOSITION FOR COMPOSITES

(75) Inventors: Paul P. Greigger, Cranberry Township, PA (US); Stephen C. Liptak, Wexford, PA (US); Thomas A. Ward, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/422,687

(22) Filed: Oct. 21, 1999

(51) Int. Cl.$^7$ ............................................... C08K 3/32
(52) U.S. Cl. ..................... 524/414; 524/416; 524/417; 379/386; 379/387; 186/198; 186/210; 186/211; 284/311; 284/306; 284/321
(58) Field of Search ................................ 524/707, 765, 524/796, 101, 86, 379, 387, 414; 523/506, 508, 461, 451

(56) References Cited

U.S. PATENT DOCUMENTS

| | | | | |
|---|---|---|---|---|
| 3,810,862 A | * | 5/1974 | Mathis et al. ............. | 260/42.45 |
| 3,891,596 A | | 6/1975 | Roberts et al. ............ | 260/40 R |
| 4,198,493 A | * | 4/1980 | Marciandi ................. | 525/164 |
| 4,410,648 A | * | 10/1983 | Kato et al. ................ | 524/101 |
| 4,503,200 A | * | 3/1985 | Corley ..................... | 525/532 |
| 4,529,467 A | | 7/1985 | Ward et al. ............... | 156/307.3 |
| 4,710,420 A | * | 12/1987 | Tonoki et al. ............. | 428/212 |
| 4,835,241 A | | 5/1989 | Waddill .................... | 528/111 |
| 4,957,950 A | * | 9/1990 | Staendeke et al. ......... | 523/205 |
| 4,997,876 A | | 3/1991 | Scarso ...................... | 524/706 |
| 5,236,773 A | | 8/1993 | Sorathia et al. ............ | 428/213 |
| 5,369,157 A | | 11/1994 | Wirth ....................... | 524/100 |
| 5,665,801 A | | 9/1997 | Chang et al. .............. | 524/125 |
| 5,686,514 A | | 11/1997 | Bayha et al. .............. | 524/145 |
| 5,696,311 A | | 12/1997 | Shorr et al. ............... | 570/210 |
| 5,700,857 A | | 12/1997 | Mukohyama .............. | 524/290 |
| 5,707,734 A | | 1/1998 | Hawkins et al. ........... | 428/372 |
| 5,710,202 A | | 1/1998 | Kuckro ..................... | 524/405 |
| 5,780,574 A | | 7/1998 | Hanabusa .................. | 528/272 |
| 5,830,582 A | | 11/1998 | Hase et al. ................ | 428/516 |
| 5,834,535 A | | 11/1998 | Abu-Isa et al. ............ | 523/179 |
| 5,855,983 A | | 1/1999 | Williams ................... | 428/172 |

FOREIGN PATENT DOCUMENTS

WO 97/31056 8/1997

OTHER PUBLICATIONS

Patent Abstracts of Japan, Publ. No. 07216146, dated Aug. 1995 to Sekisui Chem Co. Ltd. entitled "Flame Retardant Cross–Linkable Polyolefin Resin Composition".

Experimental Design of Fire Retardant Formulations: SMC Low Profile Formulations; A. Hernangil, M. Rodriguez, and L. M. Leon; Journal of Composite Materials; vol. 32, No. 23/1998.

Fire Protection of Glass/Vinyl, Ester Composites for Structural Applications U. Sorathia and C. Beck; 41st International SAMPE Symposium; Mar. 24–28, 1996.

Interactions Between Phorsphorus—and Nitrogen–Containing Flame Retardants; Hajime Nishihara, Susumu Tanji, and Ryuichiro Kanatani; Polymer Journal, vol. 30, No. 3, pp. 163–167 (1998).

Intumescent Fire–Retardant Systems; G. Camino, L. Costa & G. Martinasso; Polymer Degradation and Stability; 23 (1989) 359–376.

Intumescent Systems for Flame Retarding of Polypropylene; Menachem Lewin and Makoto Endo; Fire and Polymers II, 91–116.

Novel Intumescent Applications to Textiles; Richard Horrocks and Baljinder K Kandola; Journal of Coated Fabrics; vol. 27, Jul. 1997, pp. 17–26.

Thermal Analysis of Instumescent Coatings; A. P. Taylor and F. R. Sale; Polymers Paint Colour Journal; Mar. 4, 1992, vol. 182, No. 4301.

Standard Test Method for Surface Flammability of Materials Using a Radiant Heat Energy Source; Designation: E 162–94.

* cited by examiner

*Primary Examiner*—David W. Wu
*Assistant Examiner*—Rip A. Lee
(74) *Attorney, Agent, or Firm*—Jacques B. Miles; Dennis G. Millman

(57) ABSTRACT

A fire retardant, intumescent, curable composition for use in composite materials has as its principal ingredients a curable resin system and a fire retardant combination of a polyhydroxy compound, a polyphosphate, a nitrogen-containing compound and a polyacrylate monomer. Significant reduction of the flame spread index is achieved.

17 Claims, No Drawings

FIRE RETARDANT COMPOSITION FOR COMPOSITES

BACKGROUND OF THE INVENTION

This invention involves improving the fire resisting properties of resinous composite materials. Composite materials, most commonly fiber glass reinforced plastics, often in the form of laminates, offer a number of advantages in replacing conventional building materials such as wood, concrete, or metal. However, a disadvantage heretofore for composites has been their relatively poor ability to resist the spread of fire. This shortcoming is addressed herein.

It has been known to use intumescent coatings to provide prolonged structural integrity to walls, beams and other elements of buildings or vessels when subjected to the stress of fire. This approach is exemplified by U.S. Pat. No. 4,529,467 (Ward et al.). Intumescent compositions contain ingredients that react upon heating to generate gases and form a residue with low combustibility. The generated gases expand the residue into a foam layer with thermal insulating properties. Typically, the residue is a carbon char formed by the dehydration of a polyhydric substance such as a polyalcohol. The gas generating components of the coating are selected so that their products of decomposition do not readily support combustion, e.g., water, carbon dioxide, or ammonia. While these intumescent coatings are suitable for application onto metal surfaces in industrial settings such as refineries, ships, and drilling platforms, their textured appearance does not lend themselves to some uses. In particular, it is not considered esthetically acceptable to apply such coatings onto composite panels that otherwise present a smooth, hard, finished surface. These panels may find use, for example in transit vehicle components and in interior building modules, where appearance and a durable finish are important considerations. Compatibility of such coatings with the polymeric surfaces of the composite materials is also a concern.

Separately from the intumescent coating approach, considerable effort has been made to improve the fire resistance of polymeric materials themselves, some of them intended for use in composites. Various combinations of additives have been proposed for blending with the polymeric resin systems used for molding or laminating composites. Inorganic fillers are included in some compositions to reduce their combustion potential, but inclusion in composite resins in significantly effective amounts can compromise the strength and/or appearance of the composite. Many of the proposals involve adding a halogenated compound to the resin, but this has the drawback of generating corrosive gases and smoke upon combustion. Other additives such as arsenic or antimony compounds also have toxicity concerns.

Other approaches involve adding easily decomposable substances to the polymers that generate incombustible gases upon heating such as ammonium phosphates or hydrated alumina. Commonly used are the ammonium polyphosphates having the general formula:

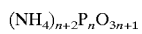

$(NH_4)_{n+2}P_nO_{3n+1}$ in which n is an integer equal to or higher than 2, preferably higher than 20 to provide low water solubility. An example of such a polyphosphate is "Phos-Chek P\30" (manufactured and sold by Solutia, Inc.) having the composition $(NH_4PO_3)_n$, in which n is higher than 50. Other phosphate examples include those derived from amines, such as dimethylammonium and diethylammonium phosphate, ethylenediamine phosphate, and melamine ortho- or pyrophosphate.

It has also been suggested to add compounds to plastic that produce the intumescent effect; that is, upon thermal decomposition, provide gaseous products and carbonaceous residues. For this reason, the following have been disclosed as additives: polyalcohols, such as glycerol, trimethylolethane, trimethylol-propane, pentaerythritol, dipentaerythritol, tripentaerythritol, 1,2,6-hexane-triol; carbohydrates in general (starch, cellulose, sugars); and nitrogen containing compounds, such as melamine, cyanuric acid, urea, thiourea, dicyandiamide, benzoguanamine and derivatives and condensation products thereof. In particular, it is known to yield a flame-retarding effect by combinations of a hydroxyalkyl-derivative of isocyanuric acid such as tris-(2-hydroxyethyl)-isocyanurate, together with a phosphorus-based product, such as ammonium polyphosphate, and another nitrogen-containing product, such as melamine, cyanuric acid, melamine salts, e.g., melamine cyanurate. The amounts of these additives that can be incorporated into the resins are also limited by the need to maintain the physical properties and appearance of the composites.

It would be desirable to improve the degree of fire retardance in composites by means of additives to the resins that are used to make the composites, without significantly compromising the physical properties or appearance of the composites.

SUMMARY OF THE INVENTION

The present invention provides a fire retardant additive combination that can be incorporated into conventional curable resin systems used to make composites, whereby the composites are provided with intumescent properties that provide significant reductions in the flame spread index while using relatively small amounts of the additive. The invention also encompasses uncured resin compositions incorporating such an additive combination, as well as the resulting composites.

The fire retardant additive of the present invention comprises the combination of a polyhydroxy compound, a polyphosphate, a nitrogen-containing compound, and a monomer having polyvinylic unsaturation such as a polyacrylate monomer. Although the first three constituents of this combination have been used in flame retardant compositions in the past, it has been found surprisingly that a significant lowering of the flame spread index can be obtained when such a combination further includes the monomer having polyvinylic unsaturation. The effectiveness of this additive combination permits use of relatively small amounts of flame retardant additive in resin systems commonly used for making composites, such that physical characteristics of the composites are not significantly affected.

Preferred embodiments of the compositions of the present invention have demonstrated flame spread index (as defined in ASTM E 162) below 15, and even below 10 in the most preferred embodiments. In these embodiments the resin content can advantageously be maintained above 30 weight percent, preferably above 40 weight percent, of the total weight of the resin system plus fire retardant additives.

The composition of the present invention does not require the use of halogens and is compatible with the curing mechanisms of thermosetting resin systems commonly used in composites. Viscosities of the compositions are suitable for the intended application without the need for detrimental levels of pigment loading.

DETAILED DESCRIPTION OF THE INVENTION

The curable resins to which are added a novel combination of fire retardant compounds in the present invention comprise conventional curable resin systems. The conventional curable resin systems are well known to those in the art of composite materials and are available from many commercial sources. By "curable" is meant that the composition has an initial state (either liquid or powder) in which it can be conveniently applied to a surface, and a final state in which it has been transformed into a more solid, coalesced state by chemical reaction, heat, or both. Typically the chemical reactions involve a main polymeric resin having reactive groups and a crosslinking monomer or oligomer. Catalysts may be employed to enable the crosslinking reaction to be carried out at lower temperatures. Other resin systems may be self-crosslinking, in which case a separate crosslinking monomer may not be necessary. As used herein, "curable" is intended to also include those resin systems that are thermoplastically affixed onto a composite structure, in which case, "curing" would entail heating the resin to at least its deformation temperature, but without involving any essential chemical reactions. For these thermoplastic systems, the initial state of the resin may be powder, granular, or sheets.

One type of resin commonly used in composites comprises unsaturated polyesters, which are well known in the art and do not require detailed description here. The polyesters are typically the product of polycondensation of dicarboxylic acids with a polyol, primarily diols. The polycarboxylic acids include unsaturated acids such as maleic acid (or anhydride) and fumaric acid and, optionally, some other acids as well, such as phthalic acid, isophthalic acid, terephthalic acid, adipic acid, or sebacic acid. The polyols are typically glycols of ethylene or propylene. Curing is usually effected by means of an unsaturated monomer such as styrene or methyl methacrylate catalyzed by a peroxide. Examples of peroxide catalysts include cumene hydroperoxide, benzoylperoxide, and methyl ethyl ketone peroxide.

Alternatively, the resin may comprise an epoxy resin, i.e., one that contains at least one oxirane group in the molecule. Hydroxyl substituent groups can also be present and frequently are, as well as ether groups. Halogen substituents may also be present. Generally, the epoxy resins can be broadly categorized as being aliphatic, aromatic, cyclic, acyclic, alicyclic or heterocyclic. Preferably aromatic epoxide resins are used. One particularly preferred group of aromatic epoxy resins are the polyglycidyl ethers of polyhydric aromatic alcohols, such as, for example, dihydric phenols. Suitable examples of dihydric phenols include resorcinol, catechol, hydroquinone, bis(4-hydroxyphenyl)-1,1-isobutane; 4,4-dihydroxybenzophenone; bis(4-hydroxyphenyl)-1,1-ethane; bis(2-hydroxynaphenyl) methane; 1,5-hydroxynaphthalene and 4,4'-isopropylidenediphenol, i.e., bisphenol A. Of the many epoxy compounds that may be utilized to synthesize the epoxy resins, the one principally utilized is epichlorohydrin, although epibromohydrin is also useful. The polyglycidyl ethers are obtained by reacting epichlorohydrin and bisphenol A in the presence of an alkali such as sodium or potassium hydroxide. The series of epoxy resins sold by Shell Chemical Company under the trademark EPON are useful. Another group of useful epoxy resins are the polyglycidyl ethers derived from such polyhydric alcohols as ethylene glycol; diethylene glycol; triethylene glycol; 1,2-propylene glycol; 1,4-butylene glycol; 1,5-pentanediol; 1,2,6-hexanetriol; glycerol and trimethylolpropane. Also useful are the epoxide resins that are polyglycidyl ethers of polycarboxylic acids. These materials are produced by the reaction of an epoxy compound such as epichlorohydrin with an aliphatic or aromatic polycarboxylic acid such as oxalic acid; succinic acid; glutaric acid; terephthalic acid; 2,6-napthalene dicarboxylic acid and dimerized linoleic acid. Still another group of epoxide resins are derived from the epoxidation of an olefinically unsaturated alicyclic material. Among these are the epoxy alicyclic ethers and esters well known in the art.

Epoxy resins also include those containing oxyalkylene groups. Such groups can be pendant from the backbone of the epoxide resin or they can be included as part of the backbone. The proportion of oxyalkylene groups in the epoxy resin depends upon a number of factors, such as the size of the oxyalkylene group and the nature of the epoxy resin.

One additional class of epoxy resins encompasses the epoxy novolac resins. These resins are prepared by reacting an epihalohydrin with the condensation product of an aldehyde with a monohydric or polyhydric phenol. One example is the reaction product of epichlorohydrin with a phenol-formaldehyde condensate. A mixture of epoxy resins can also be used herein.

The epoxy resins require the addition of a curing agent in order to convert them to thermoset materials. In general, the curing agents which can be utilized herein can be selected from a variety of conventionally known materials, for example, amine type, including aliphatic and aromatic amines, and poly(amine-amides). Examples of these include diethylene triamine; 3,3-amino bis propylamine; triethylene tetraamine; tetraethylene pentamine; m-xylylenediamine; and the reaction product of an amine and an aliphatic fatty acid such as the series of materials sold by Henkel Corporation under the name VERSAMID. Preferably the poly (amine-amide) materials such as VERSAMID or its equivalent are utilized.

Also suitable as curing agents for epoxies are polycarboxylic acids and polycarboxylic acid anhydrides. Examples of polycarboxylic acids include di-, tri-, and higher carboxylic acids such as, for example, oxalic acid, phthalic acid, terephthalic acid, succinic acid, alkyl and alkenyl-substituted succinic acids, tartaric acid, and polymerized fatty acids. Examples of suitable polycarboxylic acid anhydrides include, among others, pyromellitic anhydride, trimellitic anhydride, phthalic anhydride, succinic anhydride, and maleic anhydride. In addition, aldehyde condensation products such as urea-, melamine-, or phenol-formaldehyde are useful curing agents. A variety of these materials are commercially available under several trademark designations, for example, BEETLE and CYMEL from American Cyanamid and RESIMENE from Solutia, Inc. Other suitable curing agents include boron trihalide and complexes of boron trihalide with amines, ethers, phenols and the like; polymercaptans; polyphenols; metal salts such as aluminum chloride, zinc chloride and magnesium perchlorate; inorganic acids and partial esters such as phosphoric acid and n-butyl orthophosphite. It should be understood that blocked or latent curing agents can also be utilized if desired; for example, ketimines that are prepared from a polyamine and a ketone.

The amount of the epoxy resin and curing agent utilized can vary, but generally the equivalent ratio of epoxy to amine is within the range of from 0.05:1 to 10:1. Preferably, the epoxy to amine equivalent ratio is within the range of from 0.1:1 to 1:1, and more preferably within the range of 0.3:1 to 0.9:1.

Flame retarding properties are provided to the curable resin systems in the present invention by means of a fire retardant additive composition that includes a polyhydroxy compound, a polyphosphate compound, a nitrogen-containing compound, and a polyvinylic compound.

The polyhydroxy compound serves as a char-former in the composition, and may comprise, for example, pentaerythritol and its oligomers, glycerol, trimethylolpropane, trimethylolethane, and 1,2,6-hexanetriol. Carbohydrates may also serve this purpose. The composition of the present invention contains the polyhydroxy compound in amounts of 1 to 50 percent by weight, preferably 5 to 30 percent by weight, the percentages being based upon the total weight of the resin system, including curing agent and catalyst, and all of the fire retardant additives.

The composition includes a phosphorus compound as a source of phosphorous acid to be generated upon decomposition. The phosphorus compound may be selected from a variety of materials such as phosphoric acid, mono- and di-ammonium phosphate, phosphate esters such as tris-(2-chloroethyl)phosphate, phosphorus-containing amides such as phosphorylamide, and melamine phosphates. Preferably the source of phosphorous acid is an ammonium polyphosphate represented by the formula:

$$(NH_4)_{n+2}P_nO_{3n+1}$$

wherein n is an integer of at least 2, preferably n is an integer of at least 20, typically on the order of 50 or more. Examples of such materials are those commercially available under the trademark designations PHOS-CHEK P\30 from Solutia, Inc., and EXOLIT 422 from Clarion Corporation. The resin composition typically contains an amount of phosphorus compound in the range of 1 to 60 percent by weight, preferably 10 to 40 percent by weight, the percentages being based upon the total weight of the resin system, including curing agent and catalyst, and all of the fire retardant additives. The phosphorus is believed to function as a char promoter in the intumescent composition.

The composition also includes a nitrogen-containing compound that serves as a source of expansion gas and may become a component of the char that is formed by exposure to fire. The expansion gas causes the fire retarding composition to foam and swell when exposed to high temperatures or flames. As a result of this expansion the char which is formed is a multi-celled material that serves to insulate and protect the underlying substrate. Examples of suitable nitrogen-containing materials include melamine, alkoxylated melamine, hexamethoxymethyl melamine, urea, dimethylurea, melamine pyrophosphate, dicyandiamide, guanylurea phosphate and glycine. Other conventional sources of expansion gas can also be used such as those materials which liberate carbon dioxide. The source of expansion gas is usually present in the resin compositions of the present invention in an amount ranging from 1 to 50 percent by weight, preferably 5 to 30 percent by weight, the percentages being based upon the total weight of the resin system, including curing agent and catalyst, and all of the fire retardant additives.

Another component of the fire retardant additive of the present invention of the composition comprises one or more polyvinylic unsaturated compounds. Particularly useful are polyacrylates. Suitable for this purpose are a variety of polyacrylate monomers or oligomers that include two or more acrylate groups per molecule, preferably at least three acrylate groups. It should be understood that the term "acrylate" herein is intended to include acrylate or methacrylate groups. Compounds with single acrylate groups have been found to exhibit substantially less improvement in flame spread inhibition than those with two or more acrylate groups per molecule. A wide variety of types of polyacrylates appear to be useful in contributing to the improvements of the present invention, although it has been observed that the degree of improvement appears to decrease as the size of the polyacrylate molecule is increased. Preferred polyacrylates are those having backbones of a type that are known to contribute to char formation, for example those having alkylene or oxyalkylene backbones. Alternatively, char-forming backbones may be characterized by having less than twenty carbon atoms, preferably less than ten carbon atoms. Examples of suitable compounds include butanediol dimethacrylate, 1,3-butylene glycol diacrylate, 1,3-butylene glycol dimethacrylate, cyclohexane dimethanol diacrylate, cyclohexane dimethanol dimethacrylate, diethylene glycol diacrylate, diethylene glycol dimethacrylate, ethoxylated bisphenol A diacrylate, ethylene glycol dimethacrylate, 1,6 hexanediol diacrylate, 1,6 hexanediol dimethacrylate, neopentyl glycol diacrylate, neopentyl glycol dimethacrylate, polyethylene glycol diacrylate, propoxylated 2 neopentyl glycol diacrylate, tetraethylene glycol diacrylate, tetraethylene glycol dimethacrylate, triethylene glycol diacrylate, triethylene glycol dimethacrylate, tripropylene glycol diacrylate, propoxylated glyceryl triacrylate, ethoxylated trimethylolpropane triacrylate, pentaerythritol triacrylate, propoxylated glyceryl triacrylate, propoxylated trimethylolpropane triacrylate, trimethylolpropane triacrylate, trimethylolpropane trimethacrylate, tris (2-hydroxy ethyl) isocyanurate triacrylate, dipentaerythritol pentaacrylate, di-trimethylolpropane tetraacrylate, ethoxylated 4-pentaerythritol tetraacrylate. Commercially available blends of triacrylates and tetraacrylates have been found useful. The amount of polyacrylate in the resin composition is in the range of 1–40 weight percent, preferably 5–30 weight percent, based upon the total weight of the resin system and all of the flame retardant additives.

The fire retardant polyacrylate component should be distinguished from the unsaturated monomers that may be included as a crosslinking agents in those resin systems that are based on unsaturated resins. Although it cannot be ruled out the polyacrylate may become involved in the crosslinking reactions of such systems, it has been observed that the fire retardant effect of the polyacrylates is also effective in those resin systems that do not involve curing by way of unsaturated groups. Therefore, the polyacrylate component of the present invention is considered to be separate from and in addition to any unsaturated curing agents required by the curable resin system portion of the composition. Also, the curing agents of the resin systems are generally mono-unsaturated.

Optimized results were found to be attained when the components of the fire retardant additive included the polyphosphate component in amounts (by weight) at least as great as the amounts of the polyhydroxy component or the nitrogen-containing component, preferably as great or greater than the combined weights of the polyhydroxy component and the nitrogen-containing component. In general, these preferred embodiments also contained the polyacrylate component in amounts ranging from half that of either the polyhydroxy component or the nitrogen component to greater than that of the polyphosphate component. Although not intended to be a limitation on the broader aspects of the invention, the fire retardant composition of some of the preferred embodiments include the components in the following weight ratios with respect to each other:

1 to 10 of the polyphosphate component;
1 of the polyhydroxy component;

0.5 to 2 of the nitrogen-containing component; and 0.5 to 2 of the polyacrylate component.

The composition of the present invention can also contain a variety of conventional additives such as stabilizers, rheology control agents, flame spread control agents, and the like. These ingredients are, of course, optional and can be added in varying amounts.

The invention will be further described in connection with the examples of specific embodiments. These examples are given as illustrative of the invention and are not to be construed as limiting it to their details.

THE EXAMPLES

The procedure for preparing the test composite panels was the same for each of the examples. The polyester or epoxy resin was added to a container and the acrylate monomer was then added, followed by two minutes of stirring. In those examples where it was included, cobalt was then added with one minute of stirring. At slow stirring speed, the polyol, polyphosphate, and melamine components were added in that order over a period of three minutes, and then dispersed for 15 minutes with high speed stirring. Again at slow speed stirring, the thickener was added, followed by high speed stirring for five minutes. In the polyester based compositions, catalyst was then added and mixed at low speed for three minutes. The mixture was poured into a tray made of MYLAR resin, forming an elongated pool 17 inches long, into which was pressed a plywood sheet that had been sealed with a polyester. MODAR 814 brand polyester from Ashland Chemical was used as the sealer for the plywood, mixed with a peroxide catalyst (1% LUPERSOL DDM-9 methyl ethyl ketone peroxide from ELF Atochem North America) and a cobalt catalyst (0.15% Cobalt CEM-ALL from OMG Americas—12 percent solution). Before use in the test, each sealed plywood sheet was sanded The dimensions of the plywood sheet were 6 inches by 18 inches (15.2 cm by 45.7 cm). Shims 30 mils thick (0.76 millimeters) were employed to establish a fixed depth to which the plywood sheet was pressed into the liquid mixture. The plywood sheet was weighted and left in place for about 12 hours to cure a film of the resin mixture on its face.

The fire retardant propensity of each of the resin coated panels was tested by means of the flame spread test set forth in ASTM E 162. The test involved a radiant heat source in which each panel being tested was placed at an inclination such that the top was closer to the heat source than the bottom, with the resin coating facing the heat source. A factor ($F_s$) was derived from the rate of progress of the flame front on the panel, and another factor (Q) was a measure of the heat liberated by combustion of the material being tested. These two factors were multiplied to yield flame spread index ($I_s$) as the final test result.

In Examples 1–4 the amount of acrylate monomer was varied while maintaining a 2:1:1 weight ratio of polyphosphate to polyol to amine. In these examples the resin was VEX 169-540 a vinyl ester and styrene blend from Interplastic Corp.; the peroxide catalyst was LUPERSOL DDM-9 methyl ethyl ketone peroxide from ELF Atochem North America; the acrylate monomer was SR-444 from Sartomer, a blend of pentaerythritol triacrylate, pentaerythritol tetraacrylate, and a proprietary acrylic ester; the polyphosphate was PHOS-CHEK P\30 regular grade from Solutia, Inc.; the polyol was PE 200 pentaerythritol from Hercules Aqualon Division; the amine was crystalline melamine from Melamine Chemical Co.; the thickener was Aerosil US202 fumed silica from Degussa; and the cobalt was Cobalt Cem-All from OMG Americas (12 percent solution). In all of the Examples, the amounts of the compositional constituents are given in percent by weight of the total weight of all the constituents.

| Example: | 1 | 2 | 3 | 4 |
|---|---|---|---|---|
| Composition: | | | | |
| Resin | 43.15 | 45.97 | 36.49 | 49.19 |
| Peroxide | 1.61 | 1.53 | 1.83 | 1.47 |
| Polyacrylate | 10.79 | 5.15 | 24.37 | 0 |
| Polyphosphate | 21.57 | 22.99 | 18.24 | 24.59 |
| Polyol | 10.79 | 11.49 | 9.12 | 12.30 |
| Amine | 10.79 | 11.49 | 9.12 | 12.30 |
| Thickener | 1.14 | 1.21 | 0.64 | 0 |
| Cobalt | 0.16 | 0.15 | 0.18 | 0.15 |
| Results: | | | | |
| $F_s$ | 1.12 | 2.43 | 1.68 | 2.65 |
| Q | 4.96 | 8.56 | 8.66 | 5.99 |
| $I_s$ | 5.6 | 20.8 | 14.5 | 15.9 |

In Examples 5–10 the amount of acrylate monomer was maintained at approximately the same level as in Example 1 while varying the proportions of the polyphosphate, polyol, and amine components. The other constituents in Examples 5–10 were the same as in Examples 1–4, with the exception that the acrylate in Example 10 was SR351 trimethylol propane triacrylate from Sartomer.

| Example: | 5 | 6 | 7 | 8 | 9 | 10 |
|---|---|---|---|---|---|---|
| Composition: | | | | | | |
| Resin | 43.15 | 43.15 | 42.85 | 43.15 | 42.85 | 43.15 |
| Peroxide | 1.61 | 1.61 | 2.14 | 1.61 | 2.14 | 1.61 |
| Polyacrylate | 10.79 | 10.79 | 10.71 | 10.79 | 10.71 | 10.79 |
| Polyphosphate | 28.77 | 28.77 | 28.56 | 0 | 42.85 | 21.57 |
| Polyol | 7.19 | 0 | 14.28 | 21.57 | 0 | 10.79 |
| Amine | 7.19 | 14.38 | 0 | 21.57 | 0 | 10.79 |
| Thickener | 1.14 | 1.14 | 1.13 | 1.14 | 1.13 | 1.14 |
| Cobalt | 0.16 | 0.16 | 0.32 | 0.16 | 0.32 | 0.16 |
| Results: | | | | | | |
| $F_s$ | 1.97 | 3.26 | 2.34 | 5.42 | 4.29 | 1.82 |
| Q | 7.09 | 15.04 | 10.16 | 21.74 | 15.36 | 6.06 |
| $I_s$ | 13.9 | 49.0 | 23.8 | 117.8 | 65.9 | 11.0 |

In Examples 11, 12, and 13, the acrylate additive was varied while maintaining a 1:1:1 weight ratio of polyphosphate to polyol to amine. In Example 11, the acrylate monomer was SR-444; in Example 12 it was SR-368D from Sartomer, a blend of trimethylolpropane triacrylate and tris (2-hydroxyethyl) isocyanurate triacrylate; in Example 13, no acrylate monomer was included. The other constituents remained the same as in Examples 1–4.

| Example: | 11 | 12 | 13 |
|---|---|---|---|
| Composition: | | | |
| Resin | 43.15 | 43.15 | 49.61 |
| Peroxide | 1.61 | 1.61 | 0.75 |
| Polyacrylate | 10.79 | 10.79 | 0 |
| Polyphosphate | 14.38 | 14.38 | 16.55 |
| Polyol | 14.38 | 14.38 | 16.55 |
| Amine | 14.38 | 14.38 | 16.55 |

-continued

| Example: | 11 | 12 | 13 |
|---|---|---|---|
| Thickener | 1.14 | 1.14 | 0 |
| Cobalt | 0.16 | 0.16 | 0.15 |
| Results: | | | |
| $F_s$ | 1.12 | 1.12 | 6.56 |
| Q | 3.23 | 2.68 | 9.69 |
| $I_s$ | 3.6 | 3.0 | 63.6 |

In examples 14–18, other peroxide curable resins were substituted for the VEX 169-540 vinyl ester that was used in all of the previous examples. In Examples 14–16, the resin was Dion FR 7704-00, a halogenated unsaturated polyester from Reichhold Chemicals that has been marketed as a fire retardant material. In Examples 17 and 18 the resin was Cook 953 WA411 from Cook Composites and Polymers, a gel coat composition, i.e., a composition adapted to be a smooth surface finish on a composite article. The other constituents were the same as in the previous examples with the following exceptions: the thickener in Example 14 was CABOSIL M-5 fumed silica from Cabot Corp., and in Example 15 the acrylate was methyl methacrylate.

| Example: | 14 | 15 | 16 | 17 | 18 |
|---|---|---|---|---|---|
| Composition: | | | | | |
| Resin | 95.01 | 44.77 | 44.01 | 41.31 | 98.04 |
| Peroxide | 1.19 | 0.89 | 0.96 | 1.55 | 1.96 |
| Polyacrylate | 0 | 4.43 | 11.00 | 10.33 | 0 |
| Polyphosphate | 0 | 0 | 14.67 | 13.77 | 0 |
| Polyol | 0 | 0 | 14.67 | 13.77 | 0 |
| Amine | 0 | 0 | 14.67 | 13.77 | 0 |
| Thickener | 3.8 | 0.72 | 0 | 0 | 0 |
| Cobalt | 0 | 0 | 0 | 0 | 0 |
| Hydrated $Al_2O_3$ | 0 | 49.19 | 0 | 0 | 0 |
| Results: | | | | | |
| $F_s$ | 6.06 | 2.50 | 1.00 | 1.95 | 4.80 |
| Q | 15.99 | 16.30 | 2.36 | 4.73 | 15.80 |
| $I_s$ | 96.9 | 40.7 | 2.4 | 9.2 | 76.4 |

In Examples 19–21 the resin system was an epoxy cured with an amine in place of the polyester/peroxide resins used in the previous examples. The resin was EPON 828 bisphenol A epoxy from Shell Chemical, and the curing agent was EPICURE 3251, an aliphatic amine from Shell Chemical. The resin system also included a reactive diluent, CARDURA E-10, a glycidyl ester of neodecanoic acid from Shell Chemical. The acrylate additive was SR-444. The other constituents were the same as in Examples 1–4.

| Example: | 19 | 20 | 21 |
|---|---|---|---|
| Composition: | | | |
| Resin | 59.40 | 39.40 | 21.87 |
| Diluent | 15.08 | 10.00 | 5.56 |
| Curing agent | 25.52 | 30.60 | 16.99 |
| Polyacrylate | 0 | 20.00 | 11.12 |
| Polyphosphate | 0 | 0 | 22.23 |
| Polyol | 0 | 0 | 11.12 |
| Amine | 0 | 0 | 11.12 |
| Thickener | 0 | 0 | 0 |
| Cobalt | 0 | 0 | 0 |
| Results: | | | |
| $F_s$ | 10.69 | 12.78 | 7.30 |
| Q | 30.25 | 26.23 | 5.36 |
| $I_s$ | 323.4 | 335.2 | 39.1 |

In Examples 22 through 26, the resin was the same vinyl ester/styrene product used in Examples 1–4, and the acrylate monomer was varied, with a triacrylate/tetraacrylate in Example 22, various diacrylates in Examples 23, 24, and 25, and a monoacrylate in Example 26. Example 27 was a comparative composition with no fire retardant additives. Example 28 was another comparative composition with a conventional combination of fire retardant additives, but with no acrylate monomer. The other constituents were the same as in Examples 1–4.

| Example: | 22 | 23 | 24 | 25 | 26 | 27 | 28 |
|---|---|---|---|---|---|---|---|
| Composition: | | | | | | | |
| Resin | 43.08 | 43.05 | 43.08 | 43.08 | 43.05 | 95.51 | 43.61 |
| Peroxide | 1.61 | 1.61 | 1.61 | 1.61 | 1.61 | 0.96 | 1.63 |
| Polyacrylate/Acrylate | 10.77[a] | 10.76[b] | 10.77[c] | 10.77[d] | 10.76[e] | 0 | 0 |
| Polyphosphate | 21.54 | 21.53 | 21.54 | 21.54 | 21.53 | 0 | 21.81 |
| Polyol | 10.77 | 10.76 | 10.77 | 10.77 | 10.76 | 0 | 21.81 |
| Amine | 10.77 | 10.76 | 10.77 | 10.77 | 10.76 | 0 | 10.90 |
| Thickener | 1.14 | 1.21 | 1.14 | 1.14 | 1.21 | 3.25 | 0 |
| Cobalt | 0.32 | 0.32 | 0.32 | 0.32 | 0.32 | 0.29 | 0.24 |
| Results: | | | | | | | |
| $F_s$ | 1.31 | 2.10 | 2.84 | 3.50 | 8.28 | 4.81 | 5.23 |
| Q | 5.99 | 5.04 | 5.28 | 8.11 | 8.98 | 16.46 | 10.24 |
| $I_s$ | 7.8 | 10.6 | 15.0 | 28.4 | 74.4 | 79.2 | 53.6 |

[a]SR295 from Sartomer, a mixture of pentaerythritol triacrylate and pentaerythritol tetraacrylate
[b]SR213 1,4-butanediol diacrylate from Sartomer.
[c]SR230 diethylene glycol diacrylate from Sartomer.
[d]SR349 ethoxylated bisphenol A diacrylate from Sartomer.
[e]SR285 tetrahydrofurfuryl acrylate from Sartomer.

It will be appreciated by those of skill in the art that the invention has been described with reference to specific embodiments for the sake of providing disclosure of the best mode and that other variations and modifications can be resorted to within the scope of the invention as defined by the claims.

What is claimed is:

1. A fire retardant composition adapted to be incorporated into a polymeric composition, comprising the following components, wherein the components are present in the following weight proportions relative to one another:
   1 to 10 of the polyphosphate component;
   1 of the polyhydroxy component;
   0.5 to 2 of the nitrogen-containing component; and
   0.5 to 2 of the polyacrylate component.

2. The composition of claim 1 where the polyacrylate component comprises compounds having at least two acrylate groups.

3. The composition of claim 1 where the polyacrylate component comprises compounds having at least three acrylate groups.

4. The composition of claim 1 where the polyacrylate component is selected from the group consisting of pentaerythritol triacrylate, pentaerythritol tetraacrylate, isocyanurate triacrylates, and mixtures thereof.

5. A fire retardant composition comprising:

a curable resin system, and a fire retardant combination comprising the following components, wherein the components are present in the following weight proportions relative to one another: 1 to 10 of the polyphosphate component; 1 of the polyhydroxy component; 0.5 to 2 of the nitrogen-containing component; and 0.5 to 2 of the polyacrylate component.

6. The composition of claim 5 where the polyacrylate compound comprises compounds having at least two acrylate groups.

7. The composition of claim 5 where the polyacrylate compound comprises compounds having at least three acrylate groups.

8. The composition of claim 5 where the polyacrylate compound is selected from the group consisting of pentaerythritol triacrylate, pentaerythritol tetraacrylate, isocyanurate triacrylates, and mixtures thereof.

9. The composition of claim 5 wherein the curable resin system comprises an unsaturated polymer and an unsaturated crosslinking agent different from said polyacrylate compound.

10. The composition of claim 9 wherein the curable resin system further comprises a catalyst.

11. The composition of claim 10 wherein the curable resin comprises an unsaturated polyester and the catalyst comprises a peroxide compound.

12. The composition of claim 5 wherein the curable resin system comprises an epoxy oligomer or polymer and a crosslinking agent reactive with epoxy groups.

13. The fire retardant composition of claim 5 wherein the components are present in the following amounts:

10–95 percent of the curable resin system

1–60 percent of the polyphosphate component;

1–50 percent of the polyhydroxy component;

1–50 percent of the nitrogen-containing component; and

1–40 percent of the polyacrylate component wherein the percentages are weight percent based upon total weight of the composition.

14. The fire retardant composition of claim 5 wherein the components are present in the following amounts:

30–60 percent of the curable resin system

10–40 percent of the polyphosphate component;

5–30 percent of the polyhydroxy component;

5–30 percent of the nitrogen-containing component; and

5–30 percent of the polyacrylate component;

wherein the percentages are weight percent based upon total weight of the composition.

15. A resinous composite structure comprising at least one resinous layer comprising:

a curable resin system, and a fire retardant combination comprising the following components, wherein the components are present in the following weight proportions relative to one another: 1 to 10 of the polyphosphate component; 1 of the polyhydroxy component; 0.5 to 2 of the nitrogen-containing component; and 0.5 to 2 of the polyacrylate component.

16. The resinous composite structure of claim 15 wherein the components are present in the following amounts:

10–95 percent of the curable resin system

1–60 percent of the polyphosphate component;

1–50 percent of the polyhydroxy component;

1–50 percent of the nitrogen-containing component; and

1–40 percent of the polyacrylate component wherein the percentages are weight percent based upon total weight of the composition.

17. The composition of claim 15 where the polyacrylate monomer is selected from the group consisting of pentaerythritol triacrylate, pentaerythritol tetraacrylate, isocyanurate triacrylates, and mixtures thereof.

* * * * *